US007003983B2

(12) United States Patent
Morishita et al.

(10) Patent No.: US 7,003,983 B2
(45) Date of Patent: Feb. 28, 2006

(54) METHOD OF MANUFACTURING OPTICAL GLASS ELEMENT, AND OPTICAL GLASS ELEMENT MANUFACTURED USING THE METHOD

(75) Inventors: Masahiro Morishita, Osaka (JP); Katsuya Kamisaku, Osaka (JP); Toshiaki Mizuno, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 79 days.

(21) Appl. No.: 10/650,388

(22) Filed: Aug. 28, 2003

(65) Prior Publication Data

US 2004/0050105 A1 Mar. 18, 2004

Related U.S. Application Data

(62) Division of application No. 09/874,594, filed on Jun. 5, 2001, now abandoned.

(30) Foreign Application Priority Data

Jun. 12, 2000 (JP) ............................ 2000-176042

(51) Int. Cl.
C03B 23/047 (2006.01)

(52) U.S. Cl. ............................ 65/404; 65/437; 65/475

(58) Field of Classification Search .................. 65/404, 65/437, 475
See application file for complete search history.

(56) References Cited

U.S. PATENT DOCUMENTS

| | | | | |
|---|---|---|---|---|
| 3,879,182 A | * | 4/1975 | Strack | 65/37 |
| 3,989,495 A | * | 11/1976 | Siegmund | 65/31 |
| 4,885,020 A | * | 12/1989 | Nishino et al. | 65/404 |
| 5,080,706 A | * | 1/1992 | Snyder et al. | 65/102 |
| 5,081,639 A | * | 1/1992 | Snyder et al. | 372/101 |
| 5,155,631 A | * | 10/1992 | Snyder et al. | 359/708 |
| 5,721,050 A | * | 2/1998 | Roman et al. | 428/397 |
| 5,751,472 A | | 5/1998 | Jeys et al. | |
| 5,867,327 A | * | 2/1999 | Snyder | 359/710 |
| 6,052,224 A | | 4/2000 | Richardson | |
| 6,067,128 A | | 5/2000 | Imai | |
| 6,677,024 B1 | * | 1/2004 | Jousse et al. | 428/80 |
| 6,801,369 B1 | * | 10/2004 | Kusuyama | 359/718 |

FOREIGN PATENT DOCUMENTS

JP 10-1321 1/1998

* cited by examiner

*Primary Examiner*—Sean Vincent
(74) *Attorney, Agent, or Firm*—Frishauf, Holtz, Goodman & Chick, P.C.

(57) ABSTRACT

A method of manufacturing an optical glass element for which flatness and smoothness of the surfaces of the optical glass element can be improved while securing the similarity of the cross-sectional shape of the optical glass element to that of the mother glass, and for which continuous production involving few steps can be carried out, and an optical glass element manufactured using the method. A mother glass is prepared, which has a cross-sectional shape substantially similar to a desired cross-sectional shape of the optical glass element, and the mother glass is drawn while heating to a predetermined temperature such that the mother glass has a viscosity of $10^5$ to $10^9$ poise.

10 Claims, 6 Drawing Sheets

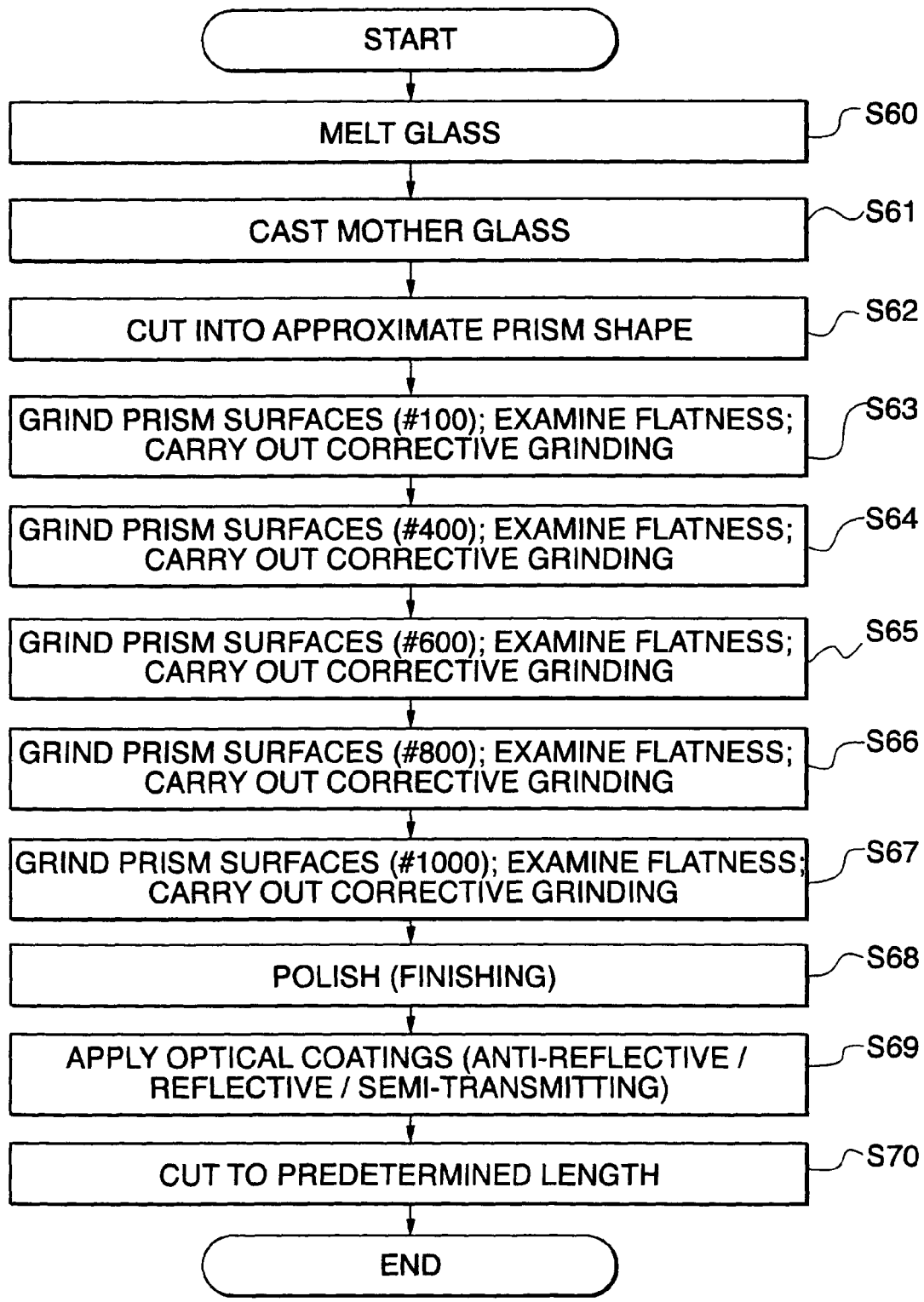

METHOD OF MANUFACTURING OPTICAL GLASS ELEMENT, AND OPTICAL GLASS ELEMENT MANUFACTURED USING THE METHOD

CROSS REFERENCE TO RELATED APPLICATIONS

This application is a division of application Ser. No. 09/874,594 filed Jun. 5, 2001, now Abandoned.

BACKGROUND OF THE INVENTION

1. Field of the Invention

The present invention relates to a method of manufacturing an optical glass element, and an optical glass element manufactured using the method, and in particular to a method of manufacturing a prism, and a prism manufactured using the method.

2. Prior Art

An example of an optical glass element used for deflecting light rays in precision optical instruments is a small prism. A prism is a transparent body having two or more optical surfaces, wherein at least one pair of surfaces are not parallel or even approximately parallel to one another, and is made of an optically isotropic material such as glass. Such prisms are classified into erect prisms that deflect light by reflection, and spectral prisms such as pentagonal prisms that split light into monochromatic light by means of optical dispersion. A basic spectral prism is a triangular prism in shape.

With an erect prism or a spectral prism, it is necessary for the flatness, which represents the extent of distortion or deformation of the prism surfaces (this flatness is the maximum value of the offset from an imaginary flat surface), to be no more than the wavelength $\lambda$ of the light reflected or split by the erect prism or spectral prism. To obtain a sufficient flatness, as shown in the flowchart in FIG. 6, conventional prism manufacturing methods involve repeatedly grinding the prism surfaces and examining the flatness of the ground surfaces.

In FIG. 6, first the glass is melted (step S60), a mother glass is cast from the molten glass (step 61), and the cast mother glass is cut into an approximate prism shape (step S62). Next, the prism surfaces of the mother glass that has been cut into an approximate prism shape are ground to a roughness of #100, then #400, then #600, then #800, and finally #1000, with the flatness being examined and corrective grinding being carried out after each of these grindings (steps S63 to S67). After this, polishing (finishing) is carried out (step 68), then optical coatings are applied to predetermined prism surfaces to make these surfaces anti-reflective, reflective or semi-transmitting (step S69), and then the prism is cut to a predetermined length (step S70), thus completing the manufacturing of the prism.

Japanese Laid-open Patent Publication (Kokai) No. 10-1321, on the other hand, discloses a method of manufacturing a prism in which a rod-shaped glass element is prepared from a mother glass using a hot drawing method, and then a long prism is obtained by press forming the glass element while softening by heating.

However, there are problems with the method of manufacturing a prism shown in FIG. 6, in that a large mother glass is gradually reduced in size by repeatedly grinding and examining a number of times until a prism of predetermined dimensions is obtained, and hence manufacturing the prism is time-consuming, and moreover, if the prism has a polygonal cross section and thus a large number of surfaces, then the number of surfaces to be ground increases correspondingly, and hence an excessive amount of time is required. Furthermore, depending on the cross-sectional shape, a special jig may be required, resulting in increased machining costs, and moreover corners may be chipped or the like during the grinding, resulting in a reduced product yield.

Moreover, there are problems with the method of manufacturing a prism disclosed in Japanese Laid-open Patent Publication (Kokai) No. 10-1321, in that it is the glass element and not the final product prism that is manufactured by the hot drawing method, and hence even if there is an increase in the smoothness of the prism surfaces of the glass element, the smoothness of the prism surfaces will drop when the prism is press formed.

SUMMARY OF THE INVENTION

It is an object of the present invention to provide a method of manufacturing an optical glass element, for which the flatness and smoothness of the surfaces of the optical glass element can be improved while securing the similarity of the cross-sectional shape of the optical glass element to that of the mother glass, and for which continuous production involving few steps can be carried out, and an optical glass element manufactured using the method.

The present inventors discovered that, if a mother glass having a cross-sectional shape substantially similar to the desired cross-sectional shape of the optical glass element is drawn while heating such that the viscosity of the mother glass becomes $10^5$ to $10^9$ poise, preferably $10^8$ to $10^9$ poise, then the flatness and smoothness of the surfaces of the optical glass element can be improved while securing the similarity of the cross-sectional shape of the optical glass element to that of the mother glass, and moreover continuous production involving few steps can be carried out. If the viscosity of the glass is less than $10^5$ poise when heating the mother glass, then similarity of the cross-sectional shape of the optical glass element to that of the mother glass cannot be secured and moreover stability of the drawing processing cannot be obtained, whereas if this viscosity is greater than $10^9$ poise, then the degree of softening of the glass is too low and the mother glass cannot be drawn but rather breaks.

Moreover, the present inventors discovered that, if the cross-sectional area of the mother glass is 5 to 150 times, preferably 10 to 100 times, the cross-sectional area of the optical glass element to be obtained, then similarity of the cross-sectional shape of the optical glass element to that of the mother glass can be secured and the smoothness of the surfaces of the optical glass element can be improved. If the cross-sectional area of the mother glass is less than 5 times the cross-sectional area of the optical glass element to be obtained, then the desired smoothness of the surfaces of the optical glass element cannot be reliably secured, whereas if the cross-sectional area of the mother glass is more than 150 times the cross-sectional area of the optical glass element to be obtained, then the reduction factor of the cross-sectional area during the hot drawing is too large and the drawn glass breaks.

To attain the above-mentioned object, the present invention provides a method of manufacturing an optical glass element, comprising the steps of preparing a mother glass having a cross-sectional shape substantially similar to a desired cross-sectional shape of the optical glass element, and drawing the mother glass while heating to a predetermined temperature such that the mother glass has a viscosity of $10^5$ to $10^9$ poise.

According to this method of manufacturing an optical glass element, a mother glass having a cross-sectional shape substantially similar to the desired cross-sectional shape of the optical glass element is drawn while heating to a temperature such that the viscosity of the mother glass becomes $10^5$ to $10^9$ poise, and hence the flatness and smoothness of the surfaces of the optical glass element can be improved while securing the similarity of the cross-sectional shape of the optical glass element to that of the mother glass, and moreover continuous production involving few steps can be carried out.

Preferably, the mother glass is drawn while heating to a predetermined temperature such that the mother glass has a viscosity of $10^8$ to $10^9$ poise.

According to this method of manufacturing an optical glass element, the above-mentioned effects can be realized reliably.

Preferably, the optical glass element is made of BK7, and the predetermined temperature is 660 to 860° C.

According to this method of manufacturing an optical glass element, the above-mentioned effects can be realized reliably.

More preferably, the optical glass element is made of BK7, and the predetermined temperature is 660 to 690° C.

According to this method of manufacturing an optical glass element, the above-mentioned effects can be realized more reliably.

Also preferably, the mother glass has a cross-sectional area 5 to 150 times that of the optical glass element to be obtained.

According to this method of manufacturing an optical glass element, the cross-sectional area of the mother glass is 5 to 150 times the cross-sectional area of the optical glass element to be obtained, and hence similarity of the cross-sectional shape of the optical glass element to that of the mother glass can be secured, and also the smoothness of the surfaces of the optical glass element can be improved.

More preferably, the cross-sectional area of the mother glass is 10 to 100 times that of the optical glass element to be obtained.

According to this method of manufacturing an optical glass element, the above-mentioned effects of similarity and surface smoothness can be realized more reliably.

In a typical preferred embodiment of the present invention, the desired cross-sectional shape is polygonal.

According to this method of manufacturing an optical glass element, a method of manufacturing an optical glass element suitable for manufacturing a prism can be provided.

For example, the optical glass element comprises a prism.

According to this method of manufacturing an optical glass element, a method of manufacturing an optical glass element suitable for manufacturing a prism can be provided.

In another preferred embodiment of the present invention, the desired cross-sectional shape is circular.

According to this method of manufacturing an optical glass element, a method of manufacturing an optical glass element suitable for manufacturing an optical glass element having a circular cross section can be provided.

In a preferred form of the present invention, the mother glass is drawn by introducing a lower end part thereof into a heating furnace at a feed speed V0 and pulling the lower end part heated to the predetermined temperature downwards at a drawing speed V1, and wherein the drawing speed V1 are set relative to the feed speed V0 so as to obtain a drawing speed ratio V1/V0 of 25 to 22,500.

According to this method of manufacturing an optical glass element, the first-mentioned effects can be realized reliably.

More preferably, the drawing speed ratio V1/V0 of the drawing speed V1 to the feed speed V0 is in a range of 100 to 10,000.

According to this method of manufacturing an optical glass element, the first-mentioned effects can be realized more reliably.

Preferably, the mother glass is made of a glass selected from the group consisting of BK7, Ultran, FK, PK, PSK, BaLK, ZK, BaK, SK, KF, BaLF, SSK, LaK, LLF, BaF, LF, F, BaSF, LaF, LaSF, SF, TiF, KZF and KZFS.

According to this method of manufacturing an optical glass element, the first-mentioned effects can be realized reliably.

To attain the above object, the present invention also provides an optical glass element manufactured by a method of manufacturing an optical glass element comprising the steps of preparing a mother glass having a cross-sectional shape substantially similar to a desired cross-sectional shape of the optical glass element, and drawing the mother glass while heating to a predetermined temperature such that the mother glass has a viscosity of $10^5$ to $10^9$ poise.

According to this optical glass element, the same effects as the first-mentioned effects can be realized.

The above and other objects, features and advantages of the invention will become more apparent from the following detailed description taken in conjunction with the accompanying drawings.

BRIEF DESCRIPTION OF THE DRAWINGS

FIG. 4A shows a case in which the cross-sectional shape of the mother glass 41 is an equilateral triangle;

FIG. 4B shows a case in which the cross-sectional shape of the mother glass 41 is an isosceles triangle;

FIG. 4C shows a case in which the cross-sectional shape of the mother glass 41 is a right-angled triangle;

FIG. 4D shows a case in which the cross-sectional shape of the mother glass 41 is a square;

FIG. 4E shows a case in which the cross-sectional shape of the mother glass 41 is an oblong;

FIG. 4F shows a case in which the cross-sectional shape of the mother glass 41 is a regular pentagon;

FIG. 4G shows a case in which the cross-sectional shape of the mother glass 41 is a regular hexagon;

FIG. 4H shows a case in which the cross-sectional shape of the mother glass 41 is a regular octagon;

FIG. 4I shows a case in which the cross-sectional shape of the mother glass 41 is a circle;

FIG. 5A shows a case in which both end faces are at right angles to the longitudinal direction of the drawn glass;

FIG. 5B shows a case in which one of the end faces is at right angles to the longitudinal direction and the other is inclined;

FIG. 5C shows a case in which both end faces are inclined in the same direction;

FIG. 5D shows a case in which both end faces are inclined but in opposite directions; and FIG. 6 is a flowchart showing a conventional method of manufacturing a prism.

DETAILED DESCRIPTION OF PREFERRED EMBODIMENTS

A method of manufacturing an optical glass element according to an embodiment of the present invention will now be described with reference to the drawings.

The optical glass element according to this embodiment of the present invention is a small prism for deflecting an optical axis in a precision optical instrument. This prism is comprised of a long glass body having a polygonal cross section.

The prism is manufactured by drawing a mother glass having a cross-sectional shape substantially similar to the cross-sectional shape of the prism while heating to a temperature such that the glass substantially softens and deforms, and then cutting this drawn glass element to a predetermined length.

Figure 1:
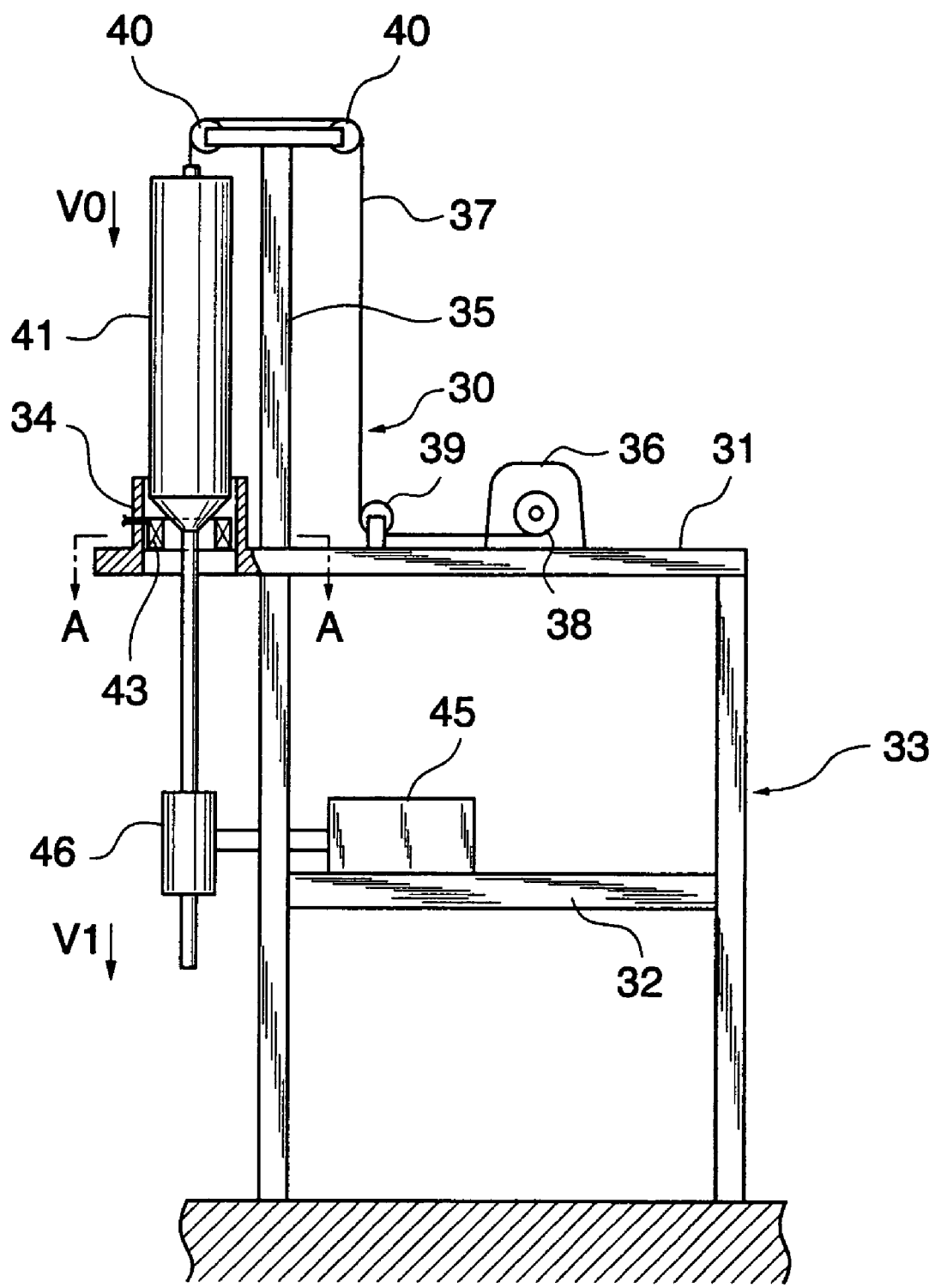
FIG. 1 is a schematic view showing the constitution of a manufacturing apparatus for implementing a method of manufacturing an optical glass element according to an embodiment of the present invention.

FIG. 1 is a schematic view showing a manufacturing apparatus for implementing the method of manufacturing an optical glass element according to this embodiment of the present invention.

In FIG. 1, the manufacturing apparatus 30 for manufacturing the prism, that is the optical glass element, has a stand 33 having an upper stage 31 and a middle stage 32. A cylindrical heating furnace 34, described below, is provided on an extended part at one end of the upper stage 31.

In a position opposite the heating furnace 34, a T-shaped supporting pillar 35 is stood on the upper stage 31, and a motor 36 is mounted on the upper stage 31 next to the supporting pillar 35. A wire 37 is passed around a pulley 38 on the drive shaft of the motor 36, a pulley 39 on the upper stage 31, and pulleys 40 at the top of the supporting pillar 35, and one end of the wire 37 is fixed to the upper end of a mother glass 41 having a predetermined cross-sectional shape. The lower end of the mother glass 41 is inserted into the heating furnace 34. The rotational speed of the drive shaft of the motor 36 is controlled by a controller not shown in the drawing, and by means of this the feed speed V0 of the mother glass 41 into the heating furnace 34 is controlled.

Figure 2:
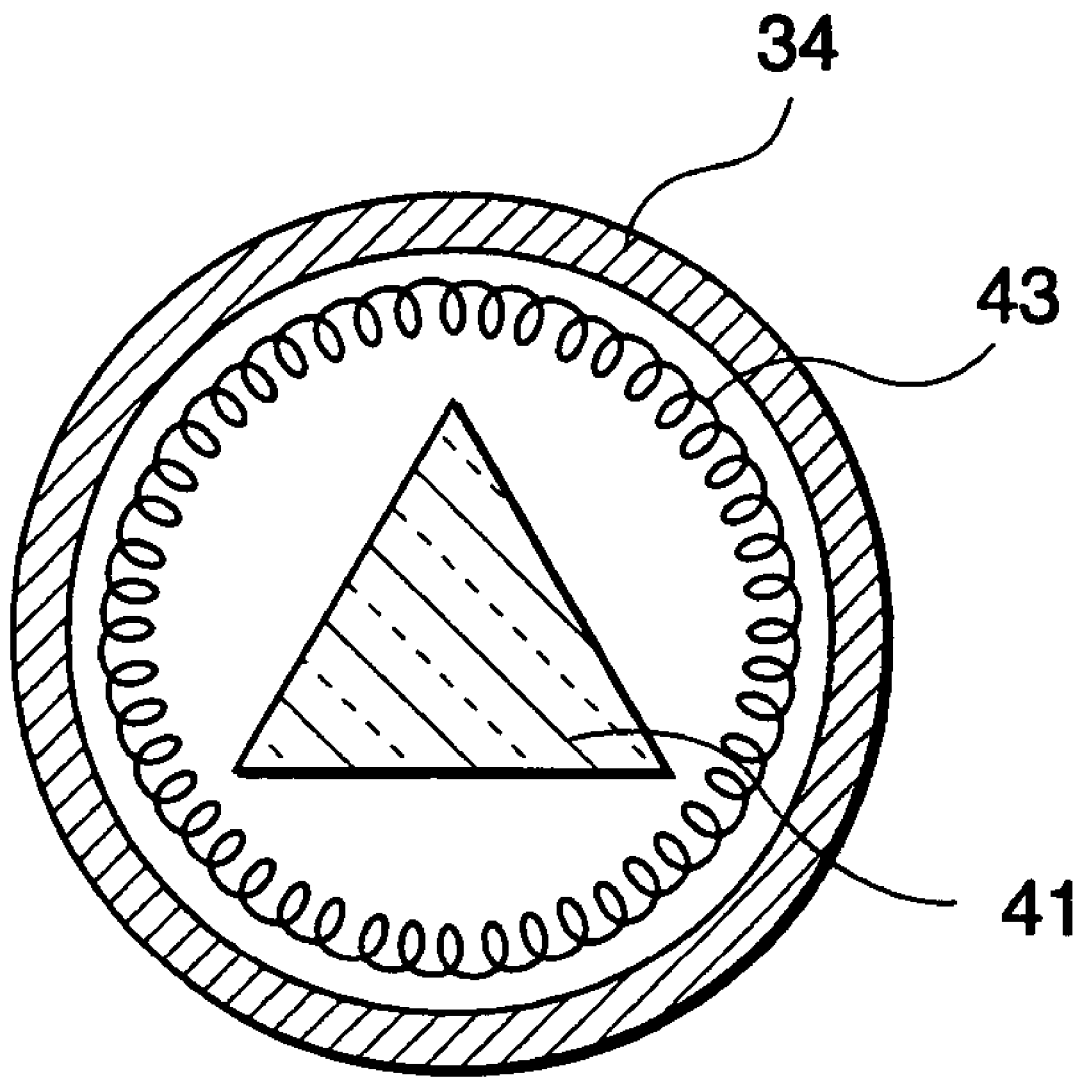
FIG. 2 is a sectional view taken along line A—A in FIG. 1.

As shown in FIG. 2, which is a sectional view taken along line A—A in FIG. 1, an electric heater coil 43 is provided on the inside of the cylindrical heating furnace 34 so as to heat the lower end of the mother glass 41. This electric heater coil 43 is connected to the aforementioned controller and is controlled by the controller.

Moreover, a motor 45 is provided on the middle stage 32 of the stand 33. A pair of drawing rollers 46 that grip and draw the drawn glass hanging down from the mother glass 41 are linked to the drive shaft of the motor 45. The rotational speed of the drive shaft of the motor 45 is controlled by the aforementioned controller, and by means of this the rotational speed of the drawing rollers 46, and hence the drawing speed V1 of the mother glass 41, is controlled.

According to the above constitution, the mother glass 41 is fed into the heating furnace 34 at a predetermined feed speed V0, and is drawn at a predetermined drawing speed V1. The drawn glass so obtained is then cut to a desired length, thus obtaining a prism having a desired cross-sectional shape.

Figure 3:
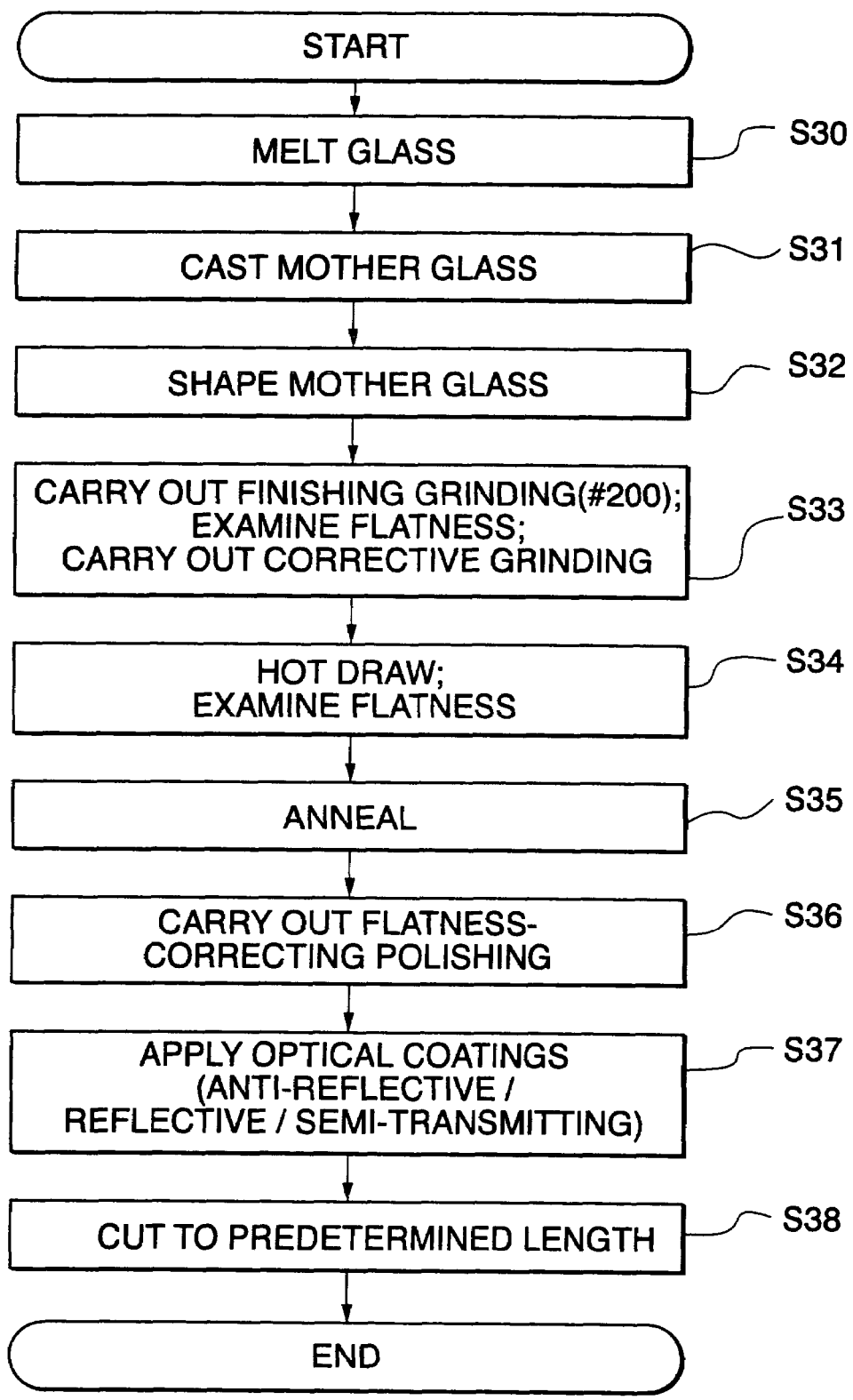
FIG. 3 is a flowchart showing a method of manufacturing an optical glass element according to an embodiment of the present invention.

A method of manufacturing a prism using the manufacturing apparatus 30 will now be described with reference to the flowchart shown in FIG. 3.

First, the glass is melted (step S30), a mother glass is cast from the molten glass (step 31), and the cast mother glass is shaped into a mother glass 41 having a cross-sectional shape substantially similar to the cross-sectional shape of the prism to be obtained (step S32). The shaping of the mother glass 41 is carried out by ordinary machining such as chopping, cutting and grinding, or by hot pressing or the like. Next, the prism surfaces of the mother glass 41 so formed are ground to a roughness of #200, the flatness is examined, and corrective grinding is carried out (step 33), thus completing the preparation of the mother glass 41. The flatness is examined using a NewView optical flatness measuring instrument (interference method) made by Zygo. The same examination method is also used for the subsequent flatness examination.

The cross-sectional area of the mother glass 41 after the above grinding is 5 to 150 times, preferably 10 to 100 times, the cross-sectional area of the prism to be obtained. If the hot drawing is carried out within this range, then a prism having smooth surfaces and good dimensional accuracy is obtained. If the cross-sectional area of the mother glass 41 is less than 5 times the cross-sectional area of the prism to be obtained, then the surface roughness of the mother glass 41 remains on the surfaces of the prism, whereas if the cross-sectional area of the mother glass 41 is more than 150 times the cross-sectional area of the prism to be obtained, then breakage occurs during the hot drawing. Note that the reciprocal of the magnification factor of the cross-sectional area of the mother glass 41 relative to the cross-sectional area of the prism to be obtained is the reduction factor of the cross-sectional area of the prism relative to the cross-sectional area of the mother glass 41. In the examples described below, the hot drawing conditions will be described in terms of this cross-sectional area reduction factor.

Figure 4A:
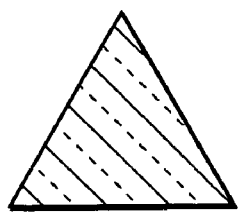
FIGS. 4A to 4I are views showing cross-sectional shapes of prisms manufactured using the method of manufacturing an optical glass element shown in FIG. 3; specifically.
Figure 4B:
Figure 4C:
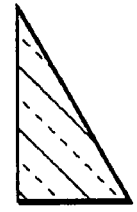
Figure 4D:
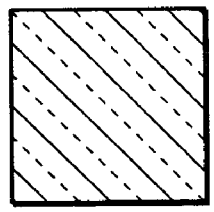
Figure 4E:
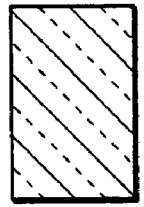
Figure 4F:
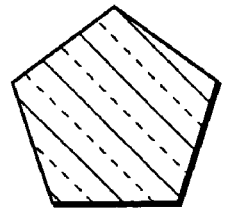
Figure 4G:
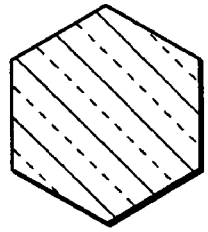
Figure 4H:
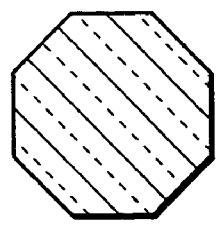
Figure 4I:
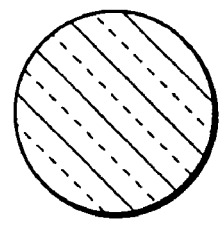

As shown in FIGS. 4A to 4I, possible cross-sectional shapes of the mother glass 41 include an equilateral triangle (FIG. 4A), an isosceles triangle (FIG. 4B), a right-angled triangle (FIG. 4C), a square (FIG. 4D), an oblong (FIG. 4E), a regular pentagon (FIG. 4F), a regular hexagon (FIG. 4G), a regular octagon (FIG. 4H) and a circle (FIG. 4I). Other possible cross-sectional shapes not shown in the drawings include general triangles, general quadrangles, general pentagons, general hexagons and general octagons.

There are no particular limitations on the material of the mother glass 41, but a material suitable for a prism is preferable, namely BK7, Ultran, FK, PK, PSK, BaLK, ZK, BaK, SK, KF, BaLF, SSK, LaK, LLF, BaF, LF, F, BaSF, LaF, LaSF, SF, TiF, KZF, KZFS or the like.

The length of the mother glass 41 is determined by the dimensional constraints of the manufacturing apparatus 30 and the like, but from the point of view of space saving the mother glass 41 is preferably long, for example 300 to 1000 mm.

Next, the mother glass 41 is hot drawn using the undermentioned procedure to obtain a drawn glass, and then the flatness of the prism surfaces is examined (step S34).

The hot drawing of the mother glass 41 is carried out by suspending the mother glass 41 prepared as above from one end of the wire 37 of the manufacturing apparatus 30, introducing the lower end of the mother glass 41 into the heating furnace 34 by rotating the drive shaft of the motor 36, heating the lower end of the mother glass 41 using the heating furnace 34 by passing a current through the electric heater coil 43, passing the drawn glass that hangs down from the mother glass 41 as a result through the drawing rollers 46, and pulling the drawn glass downwards by rotating the drawing rollers 46 using the motor 45. During this process, the motors 36 and 45 are each controlled so as to introduce the mother glass 41 into the heating furnace 34 at a predetermined feed speed V0, described below, and at the same time pull the drawn glass downwards at a predetermined drawing speed V1, described below, and while doing this the electric heater coil 43 is controlled such that the heating temperature of the mother glass 41 is in a predetermined range, described below.

Specifically, the mother glass 41 is heated to within a predetermined temperature range (below the glass softening temperature) such that the viscosity of the mother glass 41 becomes $10^5$ to $10^9$ poise, preferably $10^8$ to $10^9$ poise. For example, if the material of the mother glass 41 is BK7, then this predetermined temperature range is 660 to 860° C., preferably 660 to 690° C. The drawn glass hot drawn within such a temperature range still has a cross-sectional shape substantially similar to the cross-sectional shape of the mother glass 41. If the above-mentioned viscosity is too low, then the original shape (the shape of the mother glass 41) cannot be maintained, but rather the angles are rounded resulting in a circular or elliptical shape. On the other hand, if the above-mentioned viscosity is too high, then the drawn glass breaks during the hot drawing.

The drawing speed ratio V1/V0 of the drawing speed V1 of the mother glass 41 to the feed speed V0 of the mother glass 41 is preferably in a range of 25 to 22,500. If this drawing speed ratio is less than 25, then the draft at which the mother glass 41 is drawn is too low and productivity is poor, whereas if this drawing speed ratio is more than 22,500, then the draft is too high and the cross-sectional shape perpendicular to the drawing direction of the drawn glass becomes unstable. More preferably, the drawing speed ratio is in a range of 100 to 10,000.

Moreover, if it is necessary to reduce the risk that the internal residual stress of the drawn glass hot drawn in step S34 might exert adverse optical effects, then the drawn glass is annealed (step S35). Furthermore, if it is necessary to ensure that the flatness of the prism surfaces is no more than $\lambda/4$ (where $\lambda$ is the wavelength of the light to be reflected or split by the prism), then finishing polishing is carried out on the prism surfaces (step S36). The drawn glass hot drawn in step S34 generally has prism surfaces having a flatness of the order of $\lambda$ as described below, resulting in not much finishing polishing being required.

During the hot drawing, the prism surfaces more-or-less become fire-polished surfaces, and hence the smoothness of the machined surfaces of the original mother glass 41 is not really a problem. Here, 'fire-polished surfaces' refers to the glass surfaces obtained when the drawn glass obtained by shaping into a predetermined shape while controlling the drawing speed and the like within a viscosity range within which the glass can flow is cooled and hardened without being brought into contact with a solid object such as a forming die. These fire-polished surfaces do not have small irregularities transferred from a forming die as seen on the surfaces of press formed glass articles, and hence have the special feature of being flat to a microscopic degree.

Next, optical coatings are applied to predetermined prism surfaces to make these prism surfaces anti-reflective, reflective or semi-transmitting (step S37), and the prism is cut to a predetermined length (step S38), thus completing the manufacture of the prism. The predetermined length depends on the use, but is, for example, 1 to 20 mm, with the length of each side of the prism being, for example, 1 to 5 mm.

Figure 5A:
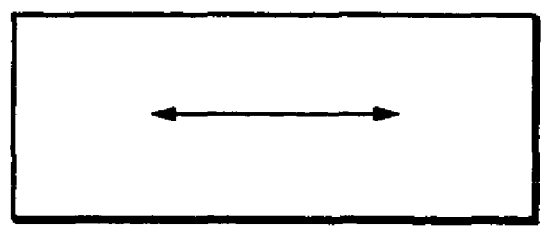
FIGS. 5A to 5D are side views of prisms showing the angles at which the drawn glass may be cut in the method of manufacturing an optical glass element shown in FIG. 3; specifically.
Figure 5B:
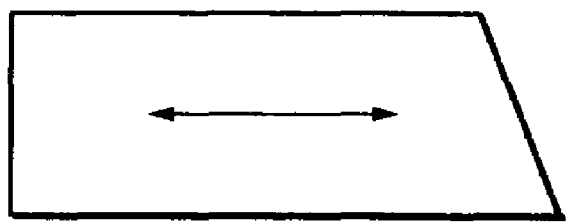
Figure 5C:
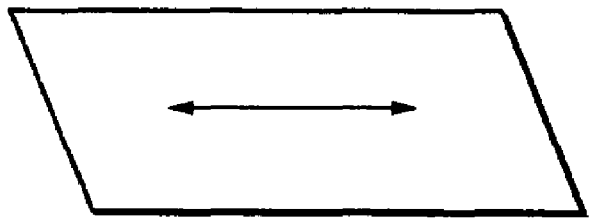
Figure 5D:
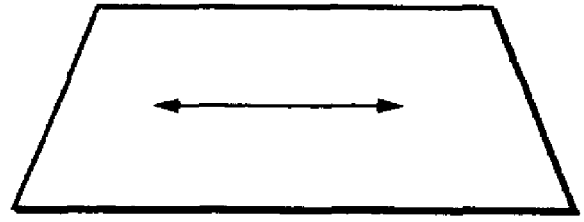

The above-mentioned cutting is carried out using a diamond saw, a glass cutter, a water jet or the like. As shown in FIGS. 5A to 5D, the angles of the cuts may be such that both end faces are at right angles to the longitudinal direction of the drawn glass (FIG. 5A) (the longitudinal direction, that is the drawing direction, is shown by the arrows in FIGS. 5A to 5D), such that one of the end faces is at right angles to the longitudinal direction and the other is inclined (FIG. 5B), such that both end faces are inclined in the same direction (FIG. 5C), or such that both end faces are inclined but in opposite directions (FIG. 5D).

According to the manufacturing method of the above embodiment, a prism having a desired cross-sectional shape substantially similar to the cross-sectional shape of the mother glass 41 can be formed from the mother glass 41. According to the manufacturing method, the prism surfaces are made to be fire-polished surfaces and hence the smoothness is improved, the flatness, which represents the extent of distortion or deformation of the prism surfaces, is improved, especially in the drawing direction, and the cross-sectional shape of the prism is made to be substantially similar to the cross-sectional shape of the mother glass 41 and hence angular parts can be made sharp. Moreover, in the case of a prism for which the flatness of the prism surfaces (the maximum value of the offset from an imaginary flat surface) only needs to be not more than the wavelength $\lambda$ of the light to be reflected or split by the prism, polishing is not necessary, and hence mass production at low cost becomes possible; even if flatness-correcting polishing is carried out to further improve the flatness of the prism surfaces of the prism, because the flatness of the prism surfaces of the drawn glass is of the order of $\lambda$ as described above, only a little polishing is required. Furthermore, with regard to the hot drawing, continuous production involving few steps is possible, which is advantageous for mass-producing optical glass element products at low cost.

Examples of the manufacturing method of the present invention will now be described.

First, samples 1 to 18, each a mother glass 41 made of the material BK7 having an equilateral triangular cross section, were prepared, and then these samples 1 to 18 were hot drawn under the manufacturing conditions (viscosity, cross-sectional area reduction factor, drawing speed ratio, whether or not surface polishing carried out) shown in Table 1, thus producing drawn glass elements (prisms). Note that sample no. 18 was sample no. 10 repolished, with about 2 mm of polishing being carried out using ceric oxide loose abrasive grains on a urethane pad.

TABLE 1

| SAMPLE NO | VISCOSITY (POISE) | CROSS-SECTIONAL AREA REDUCTION FACTOR | DRAWING SPEED RATIO | POLISHING | CROSS-SECTIONAL SHAPE SIMILARITY | DRAW-ABILITY | PRISM SURFACES FLATNESS | PRISM SURFACES SMOOTHNESS | OVERALL VERDICT |
|---|---|---|---|---|---|---|---|---|---|
| 1 | $10^5$ | 1/5 | 25 | NONE | Δ | Δ | ≈λ | ○ | Δ |
| 2 | | 1/10 | 100 | NONE | Δ | Δ | ≈λ | ○ | Δ |
| 3 | | 1/100 | 10000 | NONE | ○ | ○ | ≈λ | ○ | ○ |
| 4 | | 1/150 | 22500 | NONE | ○ | ○ | ≈λ | ○ | ○ |
| 5 | $10^8$ | 1/5 | 25 | NONE | ○ | ○ | ≈λ | ○ | ○ |
| 6 | | 1/10 | 100 | NONE | ○ | ○ | ≈λ | ○ | ○ |
| 7 | | 1/100 | 10000 | NONE | ○ | ○ | ≈λ | ○ | ○ |
| 8 | | 1/150 | 22500 | NONE | ○ | ○ | ≈λ | ○ | ○ |
| 9 | $10^9$ | 1/3 | 9 | NONE | ○ | ○ | ≈λ | X | X |
| 10 | | 1/5 | 25 | NONE | ○ | ○ | ≈λ | ○ | ○ |
| 11 | | 1/10 | 100 | NONE | ○ | ○ | ≈λ | ○ | ○ |
| 12 | | 1/100 | 10000 | NONE | ○ | ○ | ≈λ | ○ | ○ |
| 13 | | 1/150 | 22500 | NONE | ○ | Δ | ≈λ | ○ | Δ |
| 14 | $10^{10}$ | 1/5 | 25 | NONE | ○ | Δ | ≥λ | Δ | X |
| 15 | | 1/10 | 100 | NONE | ○ | Δ | ≥λ | ○ | X |
| 16 | | 1/100 | 10000 | NONE | — | COULDN'T BE DRAWN | — | — | X |
| 17 | | 1/150 | 22500 | NONE | — | COULDN'T BE DRAWN | — | — | X |
| 18 | SAMPLE NO. 10 REPOLISHED | | | | ○ | ○ | ≈λ/4 | ○ | ○ |

Next, for samples 1 to 18, the results of the hot drawing, specifically the cross-sectional shape similarity and the drawability, and the flatness and smoothness of the prism surfaces, were examined. The cross-sectional shape similarity was examined by eye, the drawability was judged by whether or not drawing could be carried out at the set speed, the flatness was measured using a NewView optical flatness measuring instrument (interference method) made by Zygo as described above, and the smoothness was examined by eye.

The examination results are shown in Table 1. In the cross-sectional shape similarity column in Table 1, ' ' indicates that continuous drawing was possible with the cross-sectional shape of the mother glass 41 being maintained, ' ' indicates that upon drawing the angular parts of the triangular prism became somewhat rounded, and '-' indicates that the hot drawing, and hence evaluation, could not be carried out. In the drawability column, ' ' indicates that hot drawing was possible at the set speed, and ' ' indicates that hot drawing was possible at the set speed but that controlling the cross-sectional area reduction factor was somewhat difficult.

Moreover, in the prism surface flatness column, '-' indicates that the hot drawing, and hence evaluation, could not be carried out. In the prism surface smoothness column, ' ' indicates that fire-polished surfaces were obtained, ' ' indicates that surfaces close to fire-polished surfaces were obtained (sufficiently close for practical purposes), ' ' indicates that marks from the machining of the mother glass 41 remained, and '-' indicates that the hot drawing, and hence evaluation, could not be carried out.

Moreover, in the overall verdict column, ' ' indicates that the prism produced was fit for practical use and that the hot drawing would be viable at an industrial level, ' ' indicates that the prism produced was fit for practical use but that the hot drawing was close to the limit of industrial viability, and ' ' indicates that it would be difficult to carry out the hot drawing at an industrial level and/or that it would be difficult to put the prism produced to practical use.

It can be seen from Table 1 that if a mother glass 41 having a cross-sectional shape substantially similar to the desired cross-sectional shape of the prism is hot drawn such that the viscosity of the mother glass 41 becomes $10^8$ to $10^9$ poise and the cross-sectional area reduction factor is in a range of ⅕ to 1/150, then the flatness and smoothness of the surfaces of the prism can be improved while securing the desired cross-sectional shape of the prism, that is a cross-sectional shape similar to that of the mother glass 41.

What is claimed is:

1. A method of manufacturing an optical glass element, comprising:
    preparing a mother glass having a cross-sectional shape substantially similar to a polygonal cross-sectional shape of said optical glass element; and
    drawing said mother glass while heating said mother glass to a predetermined temperature such that said mother glass has a viscosity of $10^8$ to $10^9$ poise.

2. The method of claim 1, wherein said mother glass is drawn while heating to a predetermined temperature such that said mother glass has a viscosity of $10^8$ to $10^9$ poise.

3. The method of claim 1, wherein said optical glass element is made of BK7, and said predetermined temperature is 660 to 860° C.

4. The method of claim 1, wherein said optical glass element is made of BK7, and said predetermined temperature is 660 to 690° C.

5. The method of claim 1, wherein the mother glass has a cross-sectional area that is 5 to 150 times that of the optical glass element to be obtained.

6. The method of claim 5, wherein the cross-sectional area of said mother glass is 10 to 100 times that of said optical glass element to be obtained.

7. The method of claim 1, wherein said optical glass element comprises a prism.

8. The method of claim 1, wherein said mother glass is drawn by introducing a lower end part thereof into a heating furnace at a feed speed V0 and pulling said lower end part heated to said predetermined temperature downwards at a drawing speed V1, and wherein said drawing speed V1 is set relative to said feed speed V0 so as to obtain a drawing speed ratio V1/V0 of 25 to 22,500.

9. The method of claim 8, wherein said drawing speed ratio V1/V0 of said drawing speed V1 to said feed speed V0 is in a range of 100 to 10,000.

10. The method ot claim 1, wherein said mother glass is made of a glass selected from the group consisting of BK7, Ultran, FK, PK, PSK, BaLK, ZK, BaK, SK, KF, BaLF, SSK, LaK, LLF, BaF, LF, F, BaSF, LaF, LaSF, SF, TiF, KZF and KZFS.

* * * * *